United States Patent
Iwasaki

(10) Patent No.: US 9,495,753 B2
(45) Date of Patent: Nov. 15, 2016

(54) SPECTRAL IMAGE DATA PROCESSING APPARATUS AND TWO-DIMENSIONAL SPECTRAL APPARATUS

(71) Applicant: CANON KABUSHIKI KAISHA, Tokyo (JP)

(72) Inventor: Kota Iwasaki, Atsugi-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 219 days.

(21) Appl. No.: 14/289,067

(22) Filed: May 28, 2014

(65) Prior Publication Data
US 2014/0355824 A1 Dec. 4, 2014

(30) Foreign Application Priority Data
May 30, 2013 (JP) ................... 2013-114045

(51) Int. Cl.
*G06K 9/00* (2006.01)
*G06T 7/00* (2006.01)
*G01J 3/28* (2006.01)

(52) U.S. Cl.
CPC ............ *G06T 7/0081* (2013.01); *G01J 3/28* (2013.01); *G01J 3/2823* (2013.01); *G06K 9/0014* (2013.01); *G06T 7/0095* (2013.01); *G06T 2207/10056* (2013.01); *G06T 2207/30024* (2013.01)

(58) Field of Classification Search
None
See application file for complete search history.

(56) References Cited

U.S. PATENT DOCUMENTS

2010/0201800 A1* 8/2010 Yamamoto ............... G01J 3/02 348/79
2011/0311133 A1* 12/2011 Hirota .................. G06T 7/0079 382/164

FOREIGN PATENT DOCUMENTS

JP 2011-174906 A 9/2011

* cited by examiner

*Primary Examiner* — Weiwen Yang
(74) *Attorney, Agent, or Firm* — Canon U.S.A. Inc., IP Division

(57) ABSTRACT

A spectral image data processing apparatus which conducts multivariate analysis on spectral image data of a sample, including: a region setting unit configured to set a region of interest for performing multivariate analysis in a sample in which a difference needs to be distinguished, the region of interest being set in accordance with spectral image data of the sample; and an analysis unit configured to perform the multivariate analysis with spectral image data inside the region of interest and spectral image data of region of non-interest which is a region other than the region of interest being distinguished from each other.

14 Claims, 10 Drawing Sheets

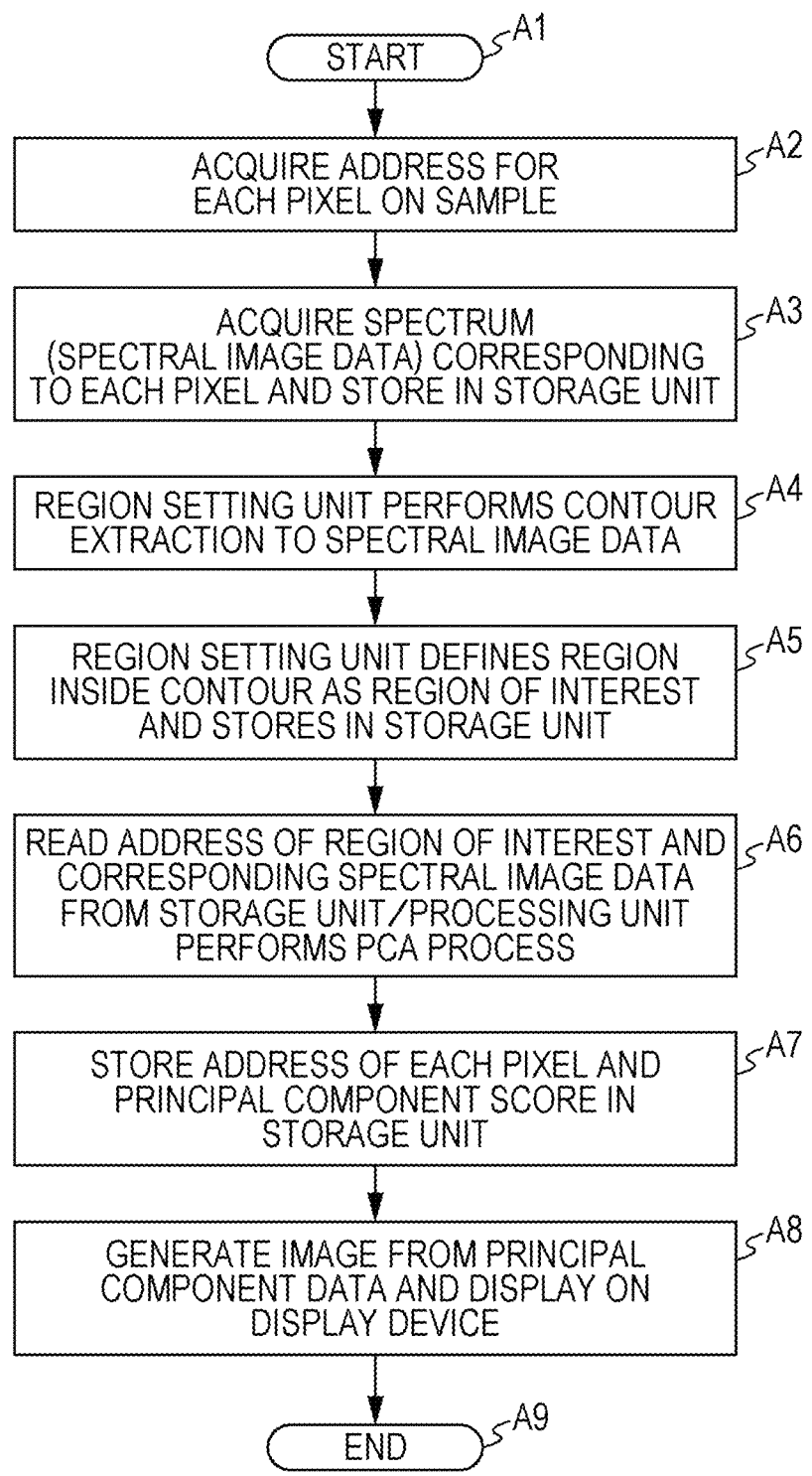

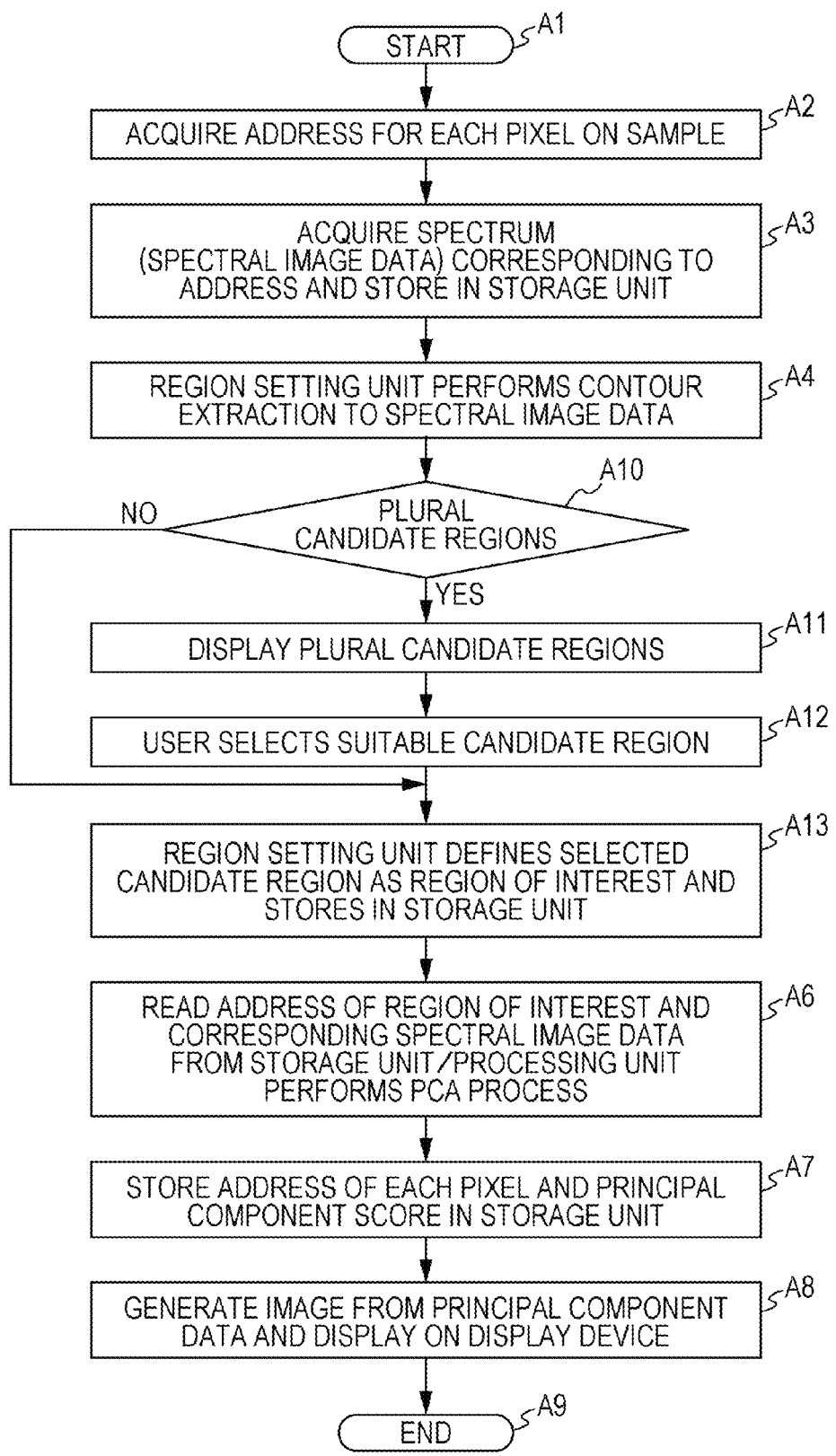

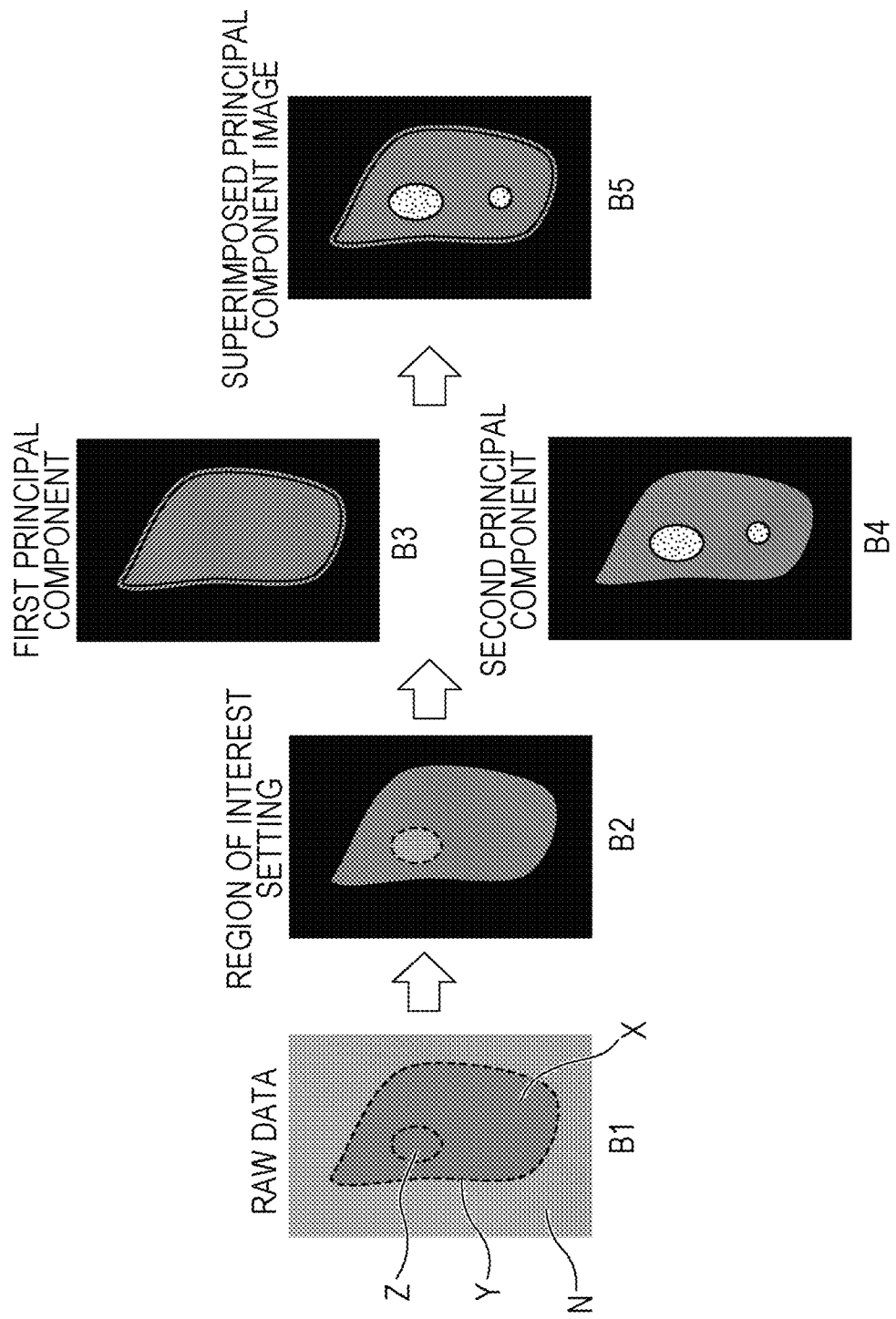

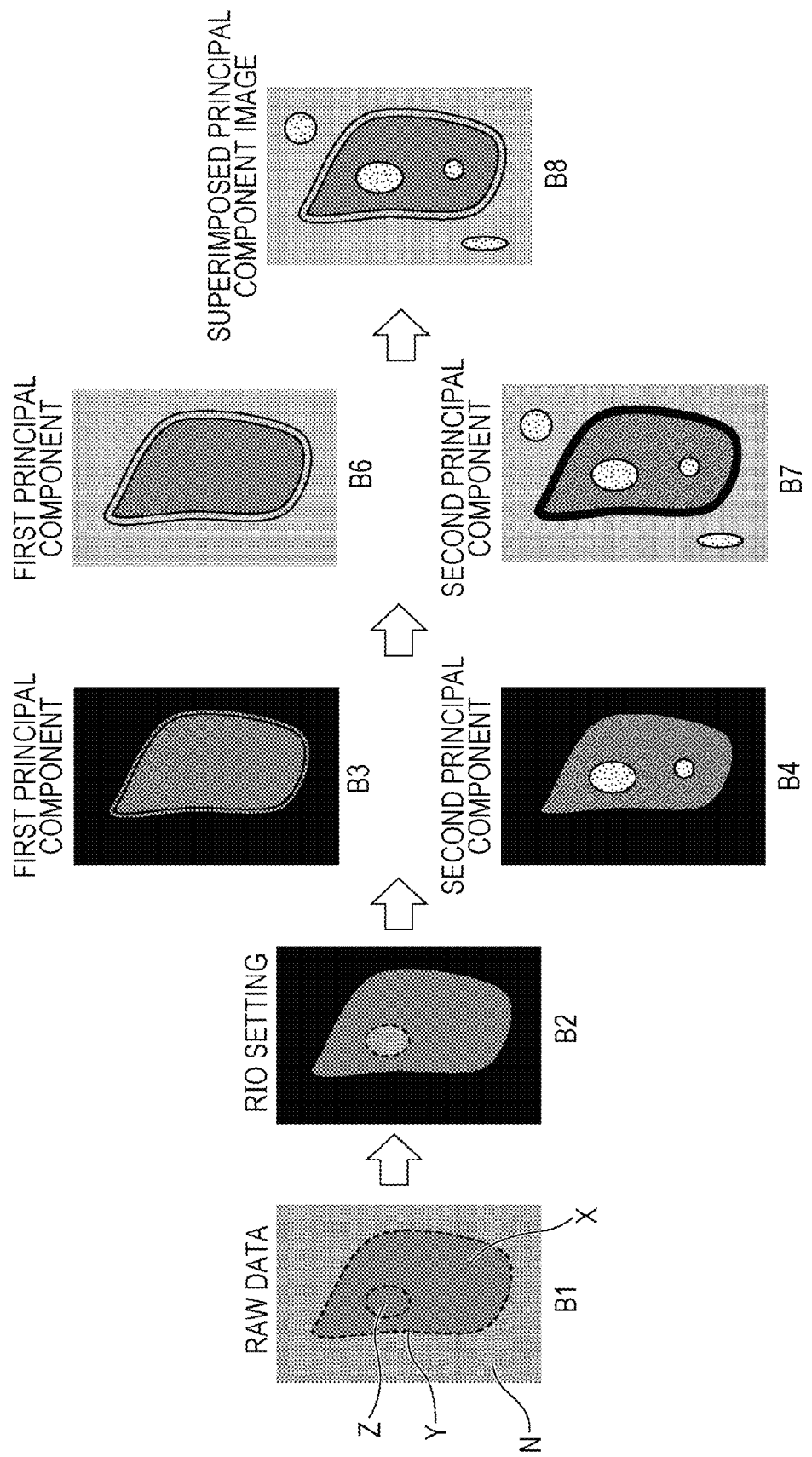

SPECTRAL IMAGE DATA PROCESSING APPARATUS AND TWO-DIMENSIONAL SPECTRAL APPARATUS

BACKGROUND OF THE INVENTION

Field of the Invention

The present invention relates to a spectral image data processing apparatus and a two-dimensional spectral apparatus for conducting multivariate analysis on spectral image data of a sample.

Description of the Related Art

Biological samples are often observed in a magnified view using, for example, a microscope. A biological sample is created by cutting tissue into thin slices. The created biological sample is substantially colorless transparent and therefore is often dyed using a pigment.

Since many kinds of substances are included in body tissue, it is possible to detect differences in chemical state and composition of these substances by measuring a spectrum (for example, visible light, ultraviolet light, Raman scattering, stimulated Raman scattering, coherent Anti-Stokes Raman scattering, infrared absorption and X-ray) of the biological sample.

Substances included in the body tissue may be detected by a mass spectrometry method which is a method in which substances are ionized and detected. In the mass spectrometry method, ionized substances are separated in accordance with the mass-to-charge ratio, and a spectrum consisting of the mass-to-charge ratio and its detected strength is obtained.

In particular, information about the form of the biological sample and the chemical state and composition of the substances may be acquired by a spectroscopic imaging method without dyeing the biological sample. Image information of the biological sample and a two-dimensional spectral apparatus for measuring a spectrum corresponding to the image information (i.e., spectral image data) are used in the spectroscopic imaging method.

As an analyzing method of the spectrum, multivariate analysis which uses intensity information as a variate with respect to a wavelength range is adopted.

According to the principal component analysis and the independent component analysis which are kinds of multivariate analysis, if the spectrum of each component included in the biological sample are superimposed to form complicated spectra, classification and measurement of the chemical state of the biological sample may be possible.

As the example thereof, Japanese Patent Laid-Open No. 2011-174906 discloses examining form information and composition of a biological sample by conducting principal component analysis of a spectrum about each pixel and obtaining distribution of principal component scores.

Since a biological sample is a non-uniform sample with various forms and composition materials, spectral image data thereof also becomes varied depending on a target pixel.

When it is necessary to distinguish a subtle difference in samples as in a pathological sample, it is necessary to measure, even though locally, the difference as precise as possible.

In this description, a region in a sample in which a subtle difference needs to be distinguished will be referred to as a "region of interest" and the rest of the region will be referred to as a "region of non-interest."

In the principal component analysis which is an example of multivariate analysis, a principal component score is calculated by applying an eigenvector to a spectrum of each pixel.

In the past, since the eigenvector has been obtained by, for example, a variance-covariance matrix using spectroscopic spectrum data of many pixels, information about many pixels has been included in the eigenvector.

If a principal component score of spectral image data in a region of interest is calculated using such a eigenvector, spectral image data of a region of non-interest has an influence on the calculated principal component score.

That is, the optimum condition in which the distribution of the principal component scores becomes the maximum with respect to the data in the region of interest is not necessarily obtained.

Therefore, there has been a problem of increasing precision in form observation and composition analysis by obtaining the optimum eigenvector when conducting principal component analysis on the spectral image data.

SUMMARY OF THE INVENTION

The present invention provides a spectral image data processing apparatus and a two-dimensional spectral apparatus capable of conducting form observation and composition analysis with high precision using spectral image data.

A spectral image data processing apparatus according to the invention is a spectral image data processing apparatus which conducts multivariate analysis on spectral image data of a sample, including: a region setting unit configured to set a region of interest for performing multivariate analysis in a sample in which a difference needs to be distinguished, the region of interest being set in accordance with spectral image data of the sample; and an analysis unit configured to perform the multivariate analysis with spectral image data inside the region of interest and spectral image data of region of non-interest which is a region other than the region of interest being distinguished from each other.

A two-dimensional spectral apparatus according to the invention is a two-dimensional spectral apparatus provided with a spectral image data processing apparatus which conducts multivariate analysis on spectral image data of a sample, wherein the spectral image data processing apparatus is configured by the spectral image data processing apparatus described above.

According to the present invention, a spectral image data processing apparatus and a two-dimensional spectral apparatus capable of conducting form observation and composition analysis with high precision can be implemented.

Further features of the present invention will become apparent from the following description of exemplary embodiments with reference to the attached drawings.

BRIEF DESCRIPTION OF THE DRAWINGS

FIGS. 1A and 1B are diagrams illustrating exemplary configurations of a spectral image data processing apparatus according to a first embodiment of the present invention, in which FIG. 1A is a schematic diagram of the spectral image data processing apparatus and FIG. 1B is a schematic diagram of a spectral image data processing apparatus which includes a second storage unit.

FIGS. 2A to 2C are diagrams illustrating exemplary configurations of a two-dimensional spectral apparatus according to the first embodiment of the present invention, in which FIG. 2A is a schematic diagram of the two-dimensional spectral apparatus, FIG. 2B is a schematic diagram of a two-dimensional spectral apparatus which includes a second detector, and FIG. 2C is a schematic diagram of a reflective two-dimensional spectral apparatus.

FIGS. 3A to 3D are diagrams illustrating each embodiment of the present invention, in which FIG. 3A illustrates the first embodiment, FIG. 3B illustrates a case in which a plurality of candidate regions exist, FIG. 3C illustrates a case in which a region of interest is determined based on a non-spectral image, and FIG. 3D is diagram illustrating an operation method of a spectral image data processing apparatus and a two-dimensional spectral apparatus according to a second embodiment.

FIGS. 4A and 4B are diagrams illustrating the first embodiment of the present invention, in which FIG. 4A illustrates image data before conducting contour extraction, and FIG. 4B illustrates image data after conducting edge detection.

FIGS. 5A to 5C are diagrams illustrating the first embodiment of the present invention, in which FIG. 5A is a schematic diagram of principal component analysis according to the present invention, FIG. 5B is a schematic diagram in a case in which principal component analysis is conducted also on a region of non-interest, and FIG. 5C is a schematic diagram illustrating a relationship of absorption spectra.

DESCRIPTION OF THE EMBODIMENTS

Hereinafter, operation methods of a spectral image data processing apparatus and a two-dimensional spectral apparatus according to an embodiment of the present invention will be described with reference to the diagrams. Although principal component analysis which is an example of multivariate analysis is applied to an absorption spectrum of a biological sample in the following description, the present invention may also be applied to other samples and spectral methods than the biological sample.

First Embodiment

Figure 1A:
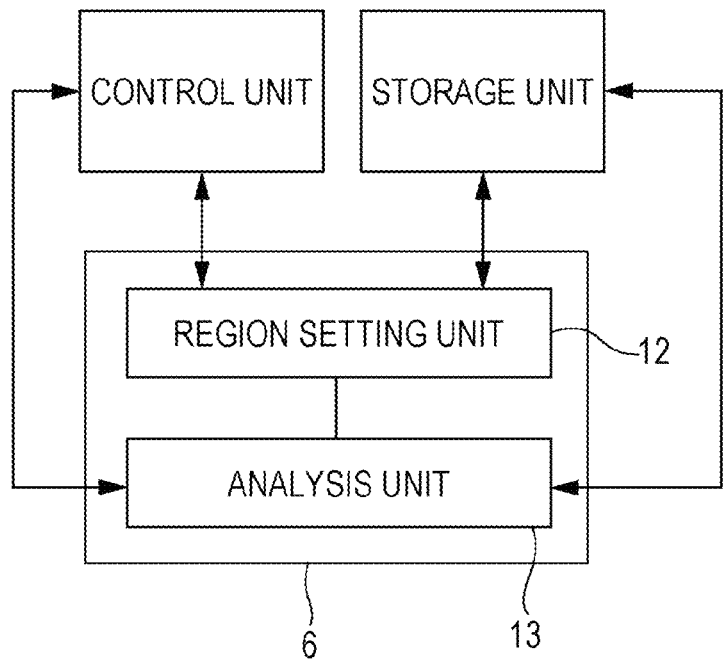

As a first embodiment, an exemplary configuration of a spectral image data processing apparatus which conducts multivariate analysis on spectral image data acquired by irradiation of an electromagnetic wave on a sample will be described with reference to FIGS. 1A to 2C. A target for which multivariate analysis is conducted by the spectral image data processing apparatus according to the present invention is not limited to the spectral image data including a spectrum acquired by irradiation of an electromagnetic wave on a sample as described above. For example, the target may be spectral image data which includes a mass spectrum of a substance included in a sample. Alternatively, the target may be spectral image data including charged particles emitted from sample, such as electron and ions, and an energy spectrum of an electromagnetic wave. A two-dimensional spectral apparatus of the present embodiment includes a light source 1, an optical system 2, a stage 3, a detector 4, a control unit 5, a spectral image data processing apparatus 6, a storage unit 7, a display unit 8 and an instruction unit 9 as illustrated in FIG. 2A. The spectral image data processing apparatus 6 includes a processing unit (a region setting unit) 12 and an analysis unit 13 as illustrated in FIG. 1A. The light source 1 may be any of a halogen lamp, a deuterium lamp, an infrared lamp, laser and light emitting diode. Two or more light sources of the same or different kinds may be used in combination. An electromagnetic wave to be emitted may be of a suitable bandwidth or may be of a variable wavelength. The bandwidth of the electromagnetic wave may be a microwave, a terahertz wave, infrared light, visible light, ultraviolet light, vacuum ultraviolet light, X-ray and the like. An electromagnetic wave A emitted from the light source 1 is converged suitably by the optical system 2 and then illuminates a biological sample 10 placed on the stage 3.

As illustrated in FIG. 2A, an electromagnetic wave B which has passed through the biological sample 10 is detected by the detector 4. By installing a spectral element 11 between the detector 4 and the biological sample 10, even if the light source 1 is a light source of a continuous wavelength, an absorption spectrum may be measured by changing a transmission wavelength of the spectral element 11. In a case in which the spectral element 11 is not used, if the light source 1 is a light source of a continuous wavelength, a bright field image including many wavelength components of a biological sample B (which will be referred to as non-spectrum in this description) may be obtained. If the light source 1 is a light source of a variable wavelength, the absorption spectrum may be measured by sweeping the wavelength.

As illustrated in a flowchart of FIG. 3A, after position information about the light emitted from the light source 1 and made to illuminate the biological sample 10 is recorded (A2), an absorption spectrum measured at that position is recorded (A3). The position information may be stage coordinate data used when the control unit 5 controls the stage 3 (first coordinate data) or may be relative position information between the stage 3 and the biological sample 10. If the detector 4 is an area sensor, the position information may be pixel coordinate data on the area sensor (second coordinate data which is different from the first coordinate data). The stage coordinate data or the pixel coordinate data, and the spectrum data corresponding to these will be referred to as spectral image data in this description. A spectral image (in this case, an absorption image) corresponding to distribution of absorbance in the biological sample is constituted by the spectral image data for each separated wavelength. Such a technique is not limitedly applied to the absorption spectrum but may be applied also to other spectrum techniques (for example, reflection, fluorescence, Raman scattering, stimulated Raman scattering and coherent Anti-Stokes Raman scattering).

Figure 2A:
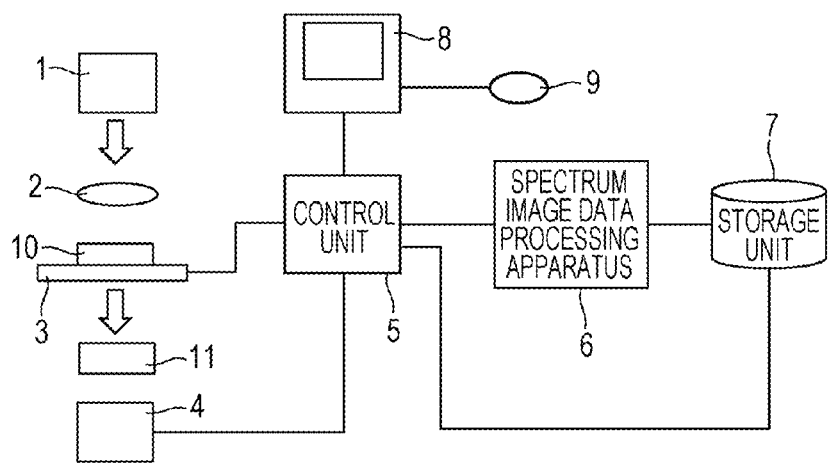
Figure 2B:
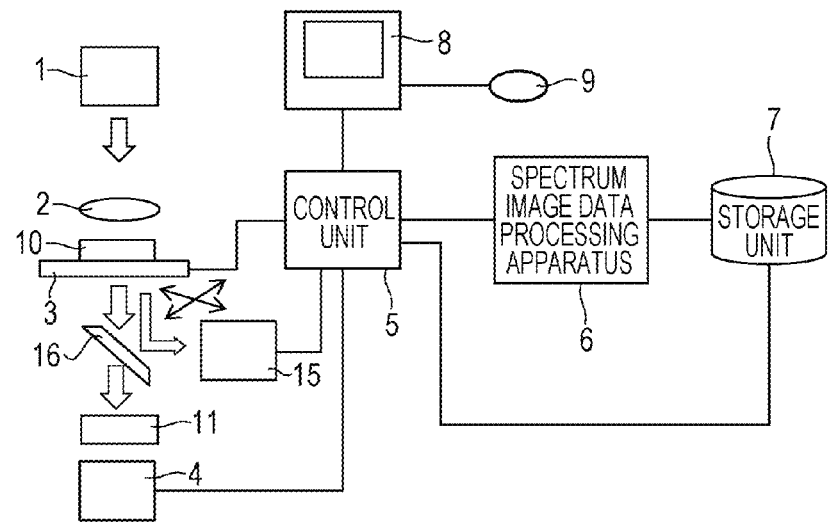
Figure 2C:
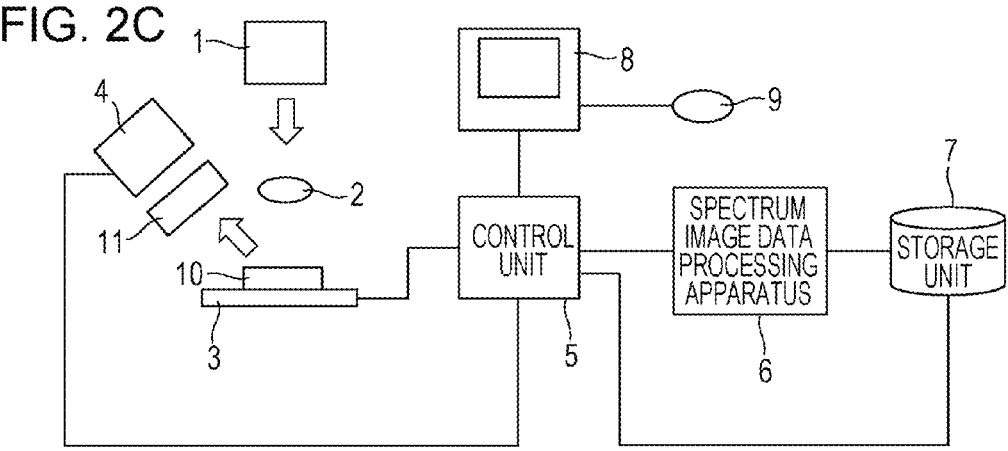

As an example, a two-dimensional spectral apparatus which acquires a reflection spectrum of a sample is illustrated in FIG. 2C. In this device, the detector 4 is installed on the same side as that of the light source 1 with respect to the stage 3 for the detection of the electromagnetic wave B reflected from the biological sample 10. Other configurations are the same as those of the two-dimensional spectral apparatuses described above. In this modification, not only the light reflected from the sample, but the fluorescence, Raman scattering, stimulated Raman scattering, coherent Anti-Stokes Raman scattering and the like may also be observed similarly.

Next, an operation method of the spectral image data processing apparatus 6 in a case in which spectral image data including an absorption spectrum as a target will be described. A suitable absorption image is selected from the spectral image data and is subject to a contour extraction process (A4) by the processing unit (the region setting unit) 12 of the spectral image data processing apparatus 6.

The wavelength range with which the selected absorption image is measured may be all the wavelength ranges that the spectral image data includes or may be a part thereof. The absorption image may be measured by a wavelength range having a suitable width, may be measured by a specific wavelength or may be measured by a combination thereof. The number of pixels included in the absorption image may be the same as or smaller than all the pixels included in the spectral image data.

Figure 4A:
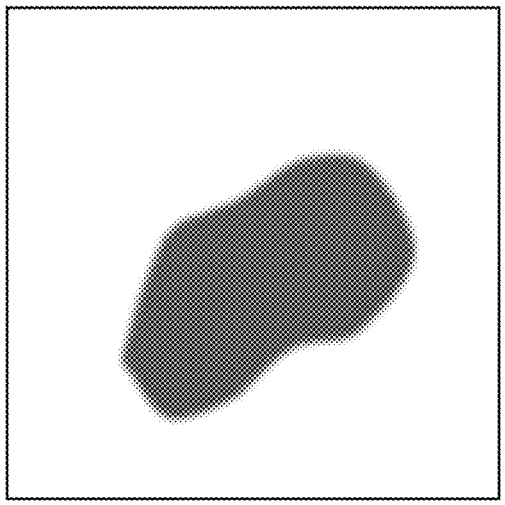
Figure 4B:
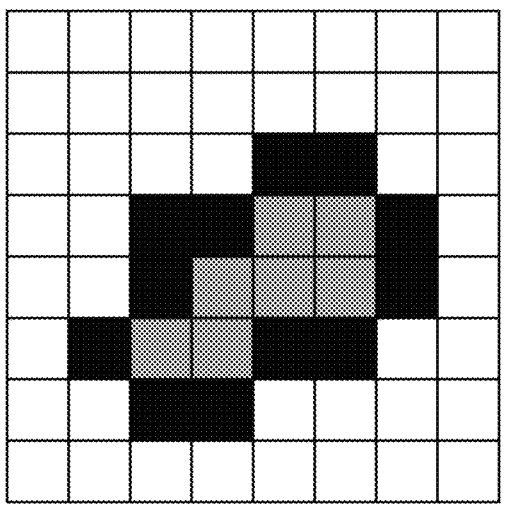

Therefore, an image corresponding to composition distribution or a structure of the biological sample is formed. As illustrated in FIGS. 4A and 4B, a contour extraction process detects edges by differences in the one-dimensional direction of absorbance and a secondary differential on the image before processing (FIG. 4A). Next, the absorption image is binarized using a suitable threshold value (FIG. 4B) and the detected edges are joined to one another, thereby forming a closed boundary line. The image data used for this process may be spectral image data based on which the following principal component score plot described below is created. Other spectral image data may also be used.

In a biological sample, contours of organizational boundaries, fiber, cell membrane, cell nuclei, intracellular organs and the like often correspond to regions of the closed boundary lines and thus observation thereof with high precision is required. For example, in pathology, it is required to detect with high precision differences between normal cells and cancer cells, between normal cell nucleus and abnormal cell nucleus, between a cytoplasmic region and a fibrous region, between an uncancerated region and a cancerated region, and the like. Therefore, the region inside the boundary line is set as a region of interest and coordinate data of that region is recorded in the storage unit 7 (A5). The coordinate data is used for reading the absorption spectrum of each pixel inside the region of interest from the storage unit 7 (A5). The region of interest is not necessarily set by such a contour extraction process: a suitable threshold value (a predetermined threshold) may be set to a tone of the image and a region with tone exceeding the threshold value may be set as a region of interest. The analysis unit 13 which received the absorption spectrum conducts an principal component analysis (A6) and records the calculated first to n-th principal component scores (Z1 to Zn) and an address of each pixel in the storage unit 7 (A7).

Figure 1B:
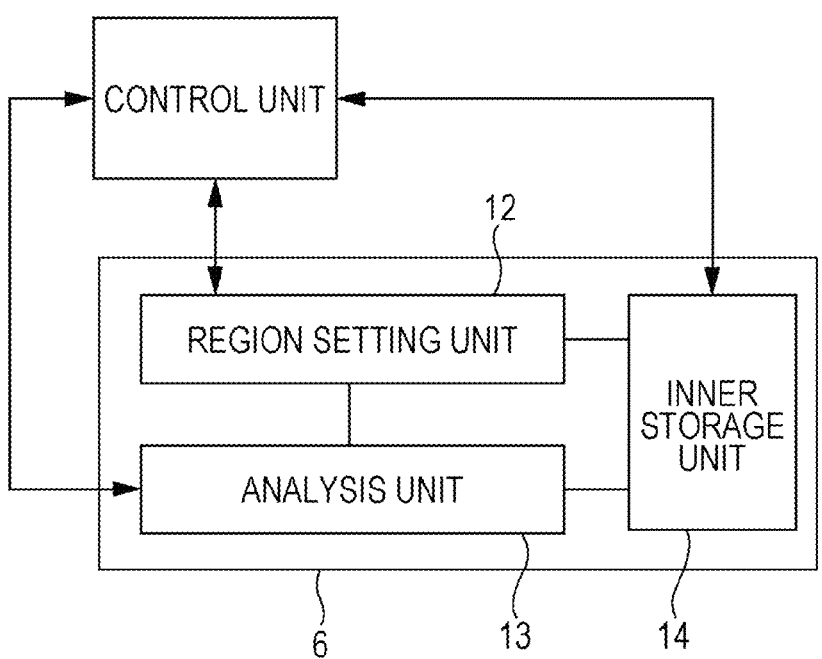

As illustrated in FIG. 1B, the spectral image data processing apparatus 6 may include an inner storage unit 14 and the coordinate data of that region may be recorded in the inner storage unit 14. In this case, the analysis unit 13 receives the coordinate data from the inner storage unit 14. In the above process, a plurality of regions surrounded by closed boundary lines may be created with respect to a single item of spectral image data or a single biological sample (in this description, referred to as "candidate regions"). In that case, as illustrated in a flowchart of FIG. 3B, the processing unit (the region setting unit) 12 may perform a branching process if necessary to determine whether a plurality of candidate regions are included (A10). If a plurality of candidate regions exist, these candidate regions are displayed on the display unit 8 via the control unit 5 (A11). The user may select a suitable region from among the candidate regions on the instruction unit 9 (A12) and the processing unit (the region setting unit) 12 which received the selection result from the instruction unit 9 may set the region of interest in response to the result (A13).

Figure 5C:
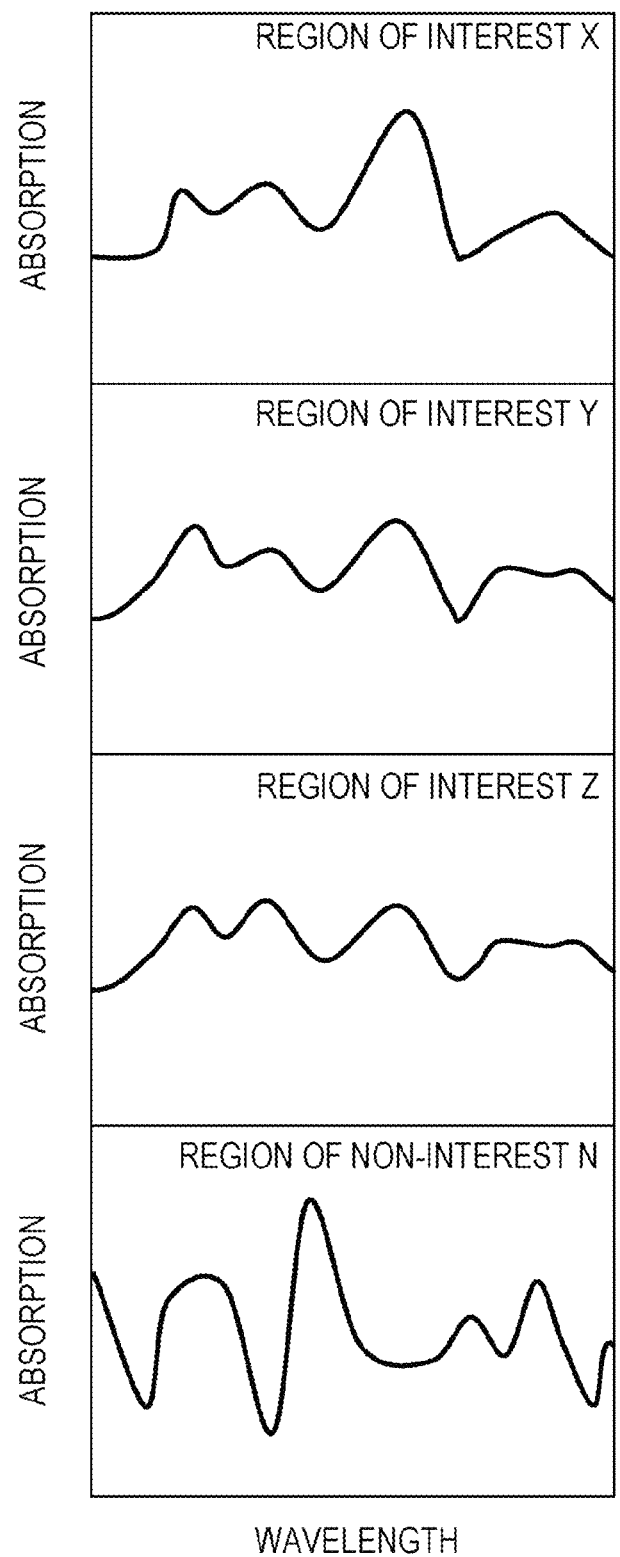

When focused on the absorption spectrum of each pixel, if different tissues and organs are compared, since chemical composition and characteristics of the substances constituting the tissues and organs differ from each other, the absorption spectra also differ from each other. On the other hand, for example, if normal cells are compared with abnormal cells, the composition itself does not change greatly even if the forms thereof may be different from each other and, therefore, it is considered that the difference in the absorption spectrum is comparatively small. FIG. 5C schematically illustrates the above relationship. The former corresponds to a case in which the absorption spectra of regions of interest X, Y and Z and the region of non-interest are compared with one another and the latter corresponds to a case in which the regions of interest X, Y and Z are compared mutually.

Here, a principal component analysis in the related art will be considered for comparison. In the related art, the principal component analysis of spectral image data is conducted without distinguishing a region of interest and a region of non-interest. An eigenvector is calculated by using a variance-covariance matrix so that dispersion of the principal component scores becomes the maximum, and all the optical spectra in FIG. 5C are used for the calculation. As described above, generally, the difference in the spectrum between the region of interest and the region of non-interest is greater than the difference in the optical spectra inside the region of interest. Therefore, the eigenvector may be determined so as to emphasize the difference between the region of interest and the region of non-interest rather than the difference in the spectrum inside the region of interest. Further, if the number of pixels in the region of non-interest is larger than the number of pixels in the region of interest, the eigenvector may be determined so as to emphasize the difference in the spectrum inside the region of non-interest. On the other hand, in the spectral image data processing apparatus of the present invention, the principal component analysis is conducted with the spectral image data inside the region of interest being distinguished from the spectral image data outside the region of interest. Therefore, the eigenvector is suitably calculated so that distribution of the principal component scores inside the region of interest may become the maximum and thus the principal component score of which the difference in spectrum inside the region of interest is emphasized may be obtained.

Next, the first to n-th principal component scores are plotted in accordance with the address of each pixel and then the first to n-th principal component score plots are generated. These plots are displayed on the display unit 8 if necessary (A9). FIG. 5A schematically illustrates an image of the above process. B1 represents spectral image data which is not subject to principal component analysis, B2 represents spectral image data for which a region of interest has been set by contour extraction, B3 represents a first principal component score plot and B4 represents a second principal component score plot. These plots may express differences in the form and the composition of the biological sample with high sensitivity and, therefore, exhibits an effect of improving precision in form observation and composition analysis. It is also possible to superimpose the first and the second score plots as in B5 to thereby express the relationship between each principal component score effectively.

Further, the principal component score may be calculated also for the spectral image data outside the region of interest using a eigenvector determined by conducting the principal component analysis on the spectral image data inside the region of interest. Then, in the same manner as described above, the first to n-th principal component score plots may be generated. FIG. 5B schematically illustrates an image of the above process. B6 represents the first principal component score plot including outside the region of interest, and B7 represents the second principal component score plot including outside the region of interest. These plots exhibit an effect of expressing differences in form and composition existing outside the region of interest effectively. Even if the form and the composition exist outside the region of interest, such a form and the composition having similar characteristics to those of the form and the composition existing inside of the region of interest may be expressed effectively.

Although the principal component analysis is used as an example of multivariate analysis in the description above, the independent component analysis may also be used. The independent component analysis is characterized by separating each spectrum using a separate matrix from among optical spectra in which optical spectra due to a plurality of substances and chemical states are intermixed. When the independent component analysis is conducted on a spectrum in the region of interest, the separate matrix is calculated so that signal independency becomes the maximum, whereby each spectrum may be separated highly precisely. Then, by plotting suitable peaks of the spectrum and signal strength of the bandwidth instead of the principal component scores, form observation and composition analysis may be conducted with high precision.

Second Embodiment

Figure 3C:
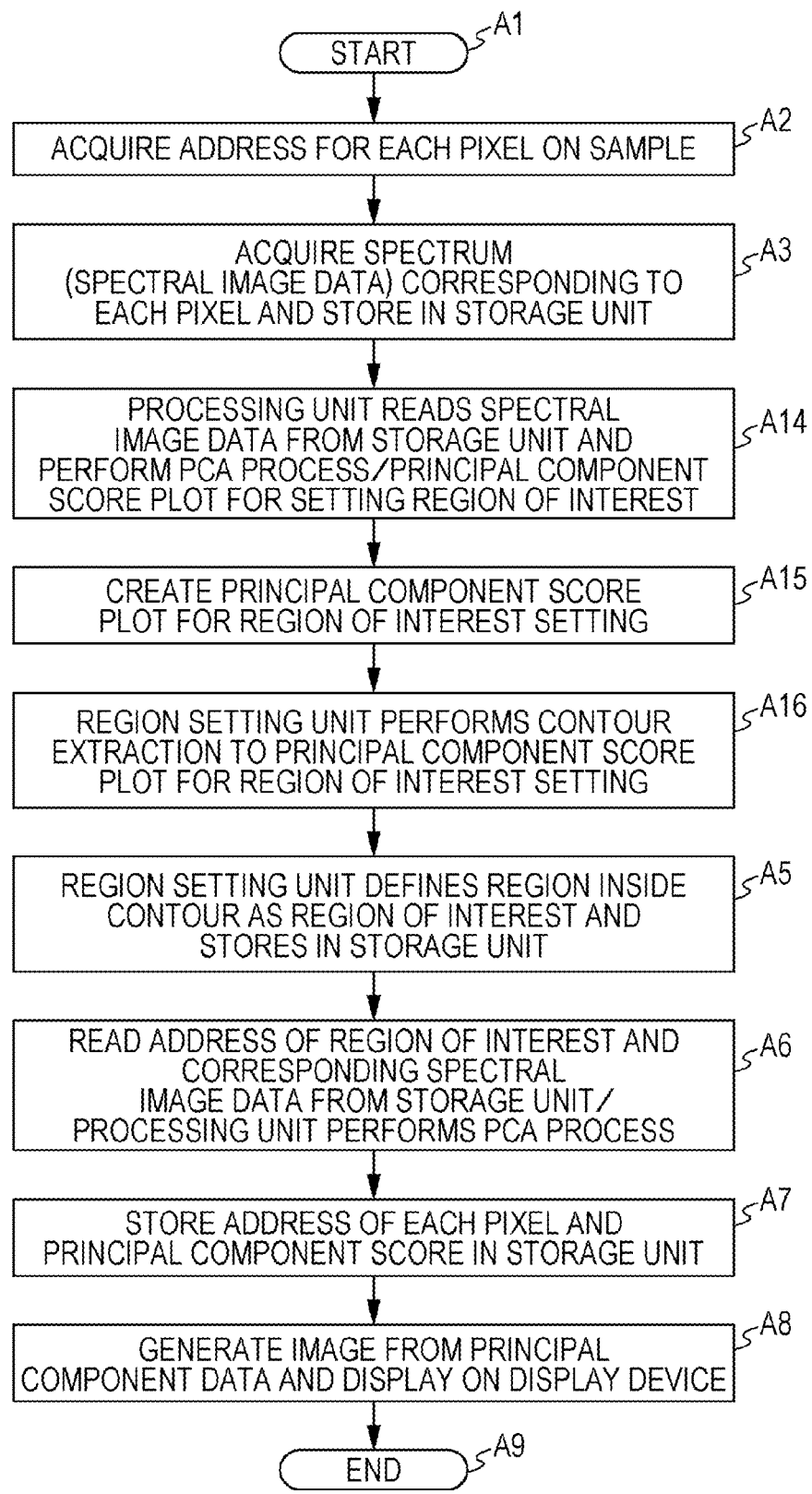

As a second embodiment, an exemplary configuration of setting a region of interest in accordance with spectral image data for which multivariate analysis is conducted in advance will be described with reference to FIG. 3C. The spectral image data processing apparatus and the two-dimensional spectral apparatus are the same as those of the embodiment described above. As illustrated in a flowchart of FIG. 3C, the process until the spectral image data is acquired is the same as that of the embodiment described above (A3). The analysis unit 13 conducts multivariate analysis by principal component analysis on previously acquired spectral image data before setting a region of interest (A14) and generates a principal component score plot (A15). The generated plot may be referred to as a principal component score plot for the region of interest setting, and may be stored in the storage unit 7.

When the principal component score plot for the region of interest setting is generated, multivariate analysis may be conducted for all the wavelength ranges that the spectral image data includes, or may be conducted only for a part of the wavelength ranges. The latter case has an effect of shortening the time required to generate the principal component score plot for the region of interest setting.

When the principal component score plot for the region of interest setting is generated, multivariate analysis may be conducted for all the pixels that the spectral image data includes, or may be conducted only for a part of the pixels. The latter case similarly has an effect of shortening the time required to generate the principal component score plot for the region of interest setting. If the limitation of the wavelength range and the limitation of the pixel are combined, further time reduction is possible.

Next, the processing unit (the region setting unit) 12 sets a region of interest to the principal component score plot for the region of interest setting in the same manner as in the embodiment described above (A16). Thereafter, principal component analysis is conducted on spectral image data inside the region of interest and the resulting principal component score plot is generated in the same procedure as that of the embodiment described above. Since a difference in the principal component score plot for the region of interest setting is emphasized as compared to spectral image data to which the principal component analysis is not applied, precision of the process of contour extraction and the like improves. Setting precision of the region of interest improves by the operation method described above. Therefore, precision in calculation of a eigenvector inside the region of interest also improves, and a difference in a spectrum inside the region of interest is emphasized, whereby an effect of improving precision in form observation and composition analysis is exhibited.

Third Embodiment

Figure 3D:
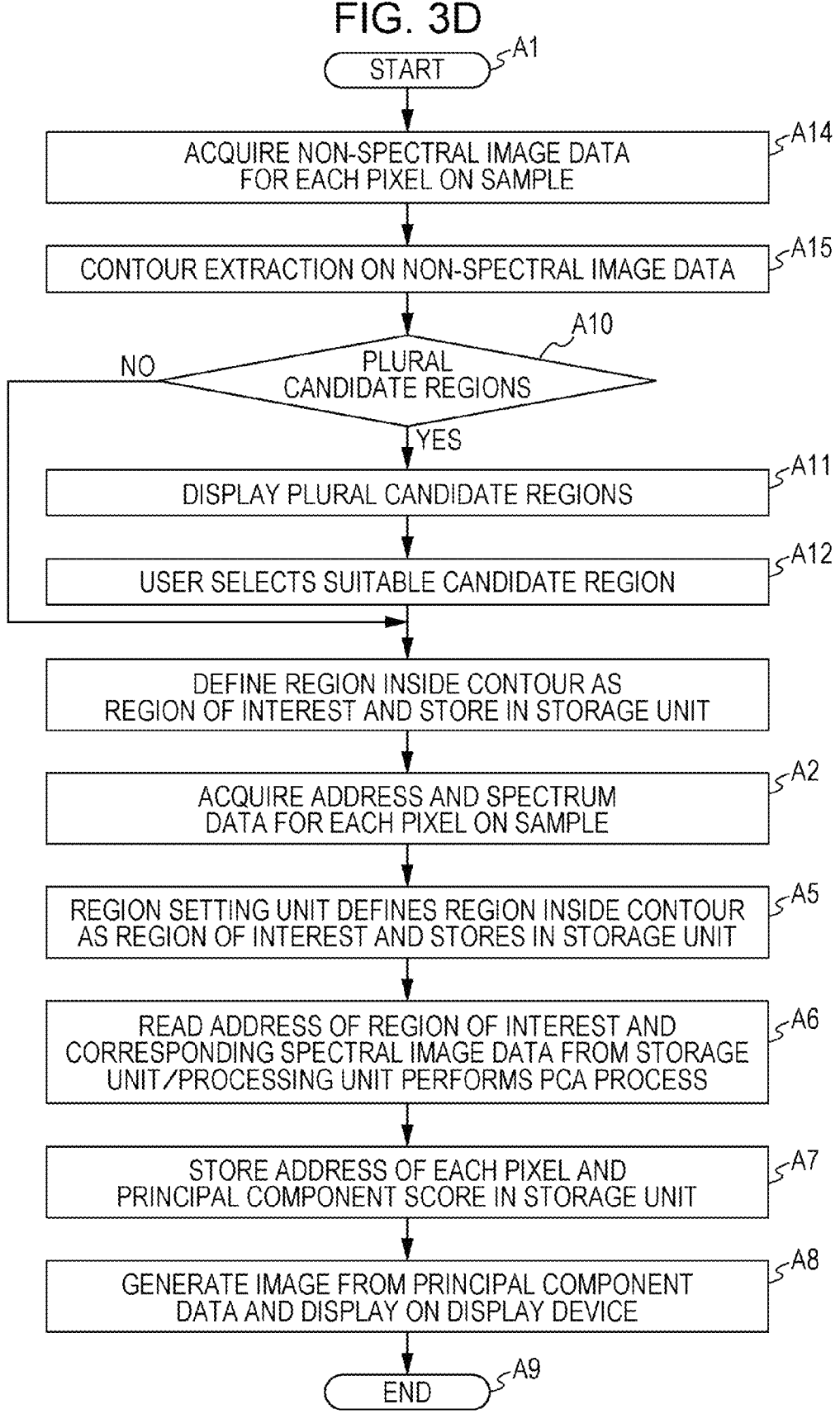

As a third embodiment, an exemplary configuration of setting a region of interest in accordance with image data which is a non-spectral image will be described with reference to FIGS. 2B and 3D. A two-dimensional spectral apparatus of the present embodiment is the same as that of the embodiment described above except that a second detector 15 and a beam splitter 16 are provided. The spectral image data processing apparatus is the same as that of the embodiment described above. As illustrated in FIG. 2B, non-spectral image data may be acquired by separating, by the beam splitter 16, at least a part of the light which has passed through the biological sample 10 and then detecting by the second detector 15. In this case, a bright field image may be acquired. By excluding the spectral element 11, non-spectral image data may also be acquired using the detector 4. According to the present embodiment, however, spectral and non-spectral image data may be simultaneously acquirable.

Generally, non-spectral image data has higher signal strength than that of the spectral image data. This is because the signals are integrated about the wavelength.

Therefore, since the non-spectral image data generally has a higher S/N ratio than the spectral image data, the processing unit (the region setting unit) 12 may set the region of interest with high precision by using the non-spectral image data. As a result, an effect of improving precision in form observation and composition analysis is exhibited.

Fourth Embodiment

As a fourth embodiment, an exemplary configuration of a two-dimensional spectral apparatus for measuring a mass spectrum which is a spectrum with respect to a mass-to-charge ratio of a substance will be described with reference to FIG. 2C. The two-dimensional spectral apparatus of the present embodiment uses an ion source as the light source 1, an ion lens as the optical system 2, a mass analyzer as a spectral element 11 and an ion detector as the detector 4. The two-dimensional spectral apparatus of the present embodiment is the same as that of the first embodiment except that these components are installed in a vacuum. The spectral image data processing apparatus 6 and an operation method thereof are the same as those of the embodiments described above.

An ion emitted from the ion source is made to irradiate the sample via the ion lens. Since a secondary ion is emitted from the sample, mass spectrometry of the secondary ion may be performed by measuring the mass-to-charge ratio of the secondary ion using the mass analyzer and the ion detector. The ion source may be a gas cluster ion source, a liquid metal ion source, surface ionization type ion source, duoplasmatron and the like. The mass analyzer may be a time-of-flight mass analyzer, a quadrupole mass analyzer, a magnetic field mass analyzer, high frequency mass analyzer and the like.

The pixel coordinate data may be stage coordinate data used when the stage 3 is controlled or may be relative position information between the stage 3 and the biological sample 10. If the detector 4 is an area sensor, the pixel coordinate data may be pixel coordinate data on the area sensor. If the pixel coordinate data on the area sensor is used, substance distribution on the sample may be projected on the detector 4.

By the method described above, the mass spectrum which is the spectrum with respect to the mass-to-charge ratio of the substance may be measured. It is also possible to acquire the mass spectrum by the MALDI method by using laser as the light source 1 and an optical lens as the optical system 2 while adding a matrix agent.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-114045, filed May 30, 2013 which is hereby incorporated by reference herein in its entirety.

What is claimed is:

1. A spectral image data processing apparatus which conducts multivariate analysis on spectral image data of a non-dyed sample, comprising:
a region setting unit configured to set a region of interest for performing multivariate analysis in the non-dyed sample in which a difference needs to be distinguished, the region of interest being set in accordance with spectral image data of the non-dyed sample; and
an analysis unit configured to perform the multivariate analysis with spectral image data inside the region of interest and spectral image data of region of non-interest which is a region other than the region of interest being distinguished from each other.

2. The spectral image data processing apparatus according to claim 1, wherein the region setting unit sets the region of interest in accordance with first spectral image data which is a target of the multivariate analysis.

3. The spectral image data processing apparatus according to claim 1, wherein the region setting unit sets the region of interest in accordance with second spectral image data which is a target of the multivariate analysis and is different from the first spectral image data.

4. The spectral image data processing apparatus according to claim 1, wherein, in the region setting unit, the volume of data used for setting the region of interest is smaller than the volume of spectral image data which is the target of the multivariate analysis inside the region of interest.

5. The spectral image data processing apparatus according to claim 1, wherein the region setting unit sets the region of interest in accordance with spectral image data for which the multivariate analysis is conducted in advance.

6. The spectral image data processing apparatus according to claim 1, wherein the region setting unit sets the region of interest in accordance with non-spectral image data.

7. The spectral image data processing apparatus according to claim 1, wherein the region setting unit sets the region of interest in accordance with the second spectral image data which has a different number of pixels from that of the first spectral image data.

8. The spectral image data processing apparatus according to claim 1, wherein the region setting unit sets the region of interest in accordance with a result of having performed a contour extraction process to the spectral image data.

9. The spectral image data processing apparatus according to claim 1, wherein the region setting unit sets a predetermined threshold to a tone of the spectral image data and sets a region having a tone exceeding the predetermined threshold as the region of interest.

10. The spectral image data processing apparatus according to claim 1, wherein the region setting unit sets a candidate region selected by a user as the region of interest from among two or more candidate regions which are candidates of the region of interest.

11. The spectral image data processing apparatus according to claim 1, wherein the analysis unit calculates a eigenvector by performing the multivariate analysis to spectral image data in the region of interest and,
using the eigenvector, obtains a principal component score in which a difference in the spectral image data in at least the region of interest is emphasized.

12. A two-dimensional spectral apparatus provided with a spectral image data processing apparatus which conducts multivariate analysis on spectral image data of a non-dyed sample, wherein the spectral image data processing apparatus is configured by the spectral image data processing apparatus according to claim 1.

13. A method of processing spectral image data in which multivariate analysis is conducted on spectral image data of a non-dyed sample, the method comprising:
setting a region of interest for performing multivariate analysis in the non-dyed sample in which a difference needs to be distinguished, the region of interest being set in accordance with spectral image data of the non-dyed sample; and
performing the multivariate analysis with spectral image data inside the region of interest and spectral image data of region of non-interest which is a region other than the region of interest being distinguished from each other.

14. A non-transitory computer-readable medium storing instructions that, when executed by a processor, implement a method of processing spectral image data in which multivariate analysis is conducted on spectral image data of a non-dyed sample, the method comprising,
after storing the spectral image data of the non-dyed sample in a recording unit, reading the spectral image data from the recording unit and transmits to the read spectral image data to a region setting unit, storing, in the storage unit, a region of interest defined by the region setting unit to be a region in which a difference in the non-dyed sample needs to be distinguished in accordance with the spectral image data, transmitting spectral image data inside the region of interest to a processing unit from the storage unit, and conducting, in the processing unit, the multivariate analysis with spectral image data inside the region of interest and spectral image data of a region of non-interest which is a region other than the region of interest being distinguished from each other.

\* \* \* \* \*